US007966768B2

(12) United States Patent
DiPaolo et al.

(10) Patent No.: US 7,966,768 B2
(45) Date of Patent: Jun. 28, 2011

(54) STAKING SYSTEM FOR GROWING CONTAINER

(75) Inventors: Frank DiPaolo, Scranton, PA (US); Matthew Markefka, Richboro, PA (US); Clifford Fay, Harveys Lake, PA (US)

(73) Assignee: Laminations, Inc., Scranton, PA (US)

( * ) Notice: Subject to any disclaimer, the term of this patent is extended or adjusted under 35 U.S.C. 154(b) by 0 days.

(21) Appl. No.: 11/953,521

(22) Filed: Dec. 10, 2007
(Under 37 CFR 1.47)

(65) Prior Publication Data
US 2009/0056217 A1    Mar. 5, 2009

Related U.S. Application Data

(63) Continuation of application No. 11/374,307, filed on May 1, 2006, now abandoned.

(51) Int. Cl.
*A01G 9/02*     (2006.01)
*A01G 9/12*     (2006.01)
(52) U.S. Cl. .................................... 47/70; 47/39; 47/67
(58) Field of Classification Search ............ 47/70, 71, 47/18, 39, 44, 45, 47, 66.1, 901, 67; 4/592–594; 248/678, 188.1, 188.8, 188.91, 218.4, 364.03, 248/27.8; 160/46; *A01G 9/02, 9/12*
See application file for complete search history.

(56) References Cited

U.S. PATENT DOCUMENTS

| 150,527 | A | * | 5/1874 | Chase ................................. 47/39 |
| 2,083,678 | A | * | 6/1937 | Wilson ............................... 47/47 |
| 2,554,100 | A | * | 5/1951 | Facchini .......................... 73/323 |
| 3,026,649 | A | * | 3/1962 | Barakauskas ..................... 47/70 |
| 3,619,852 | A | * | 11/1971 | Eckberg .......................... 16/425 |
| 4,786,021 | A | * | 11/1988 | Vattier .......................... 248/188 |
| 4,841,670 | A | * | 6/1989 | Bitter ................................ 47/47 |
| 5,327,678 | A | * | 7/1994 | Schweiker ........................ 47/70 |
| 5,638,638 | A | * | 6/1997 | Moskowitz ....................... 47/71 |
| 2008/0263949 | A1 | | 10/2008 | Early |

FOREIGN PATENT DOCUMENTS

JP         2000037139 A  *  2/2000

* cited by examiner

*Primary Examiner* — David J Parsley
*Assistant Examiner* — Marisa Conlon
(74) *Attorney, Agent, or Firm* — Douglas E. Jackson, Esq.; William E. Jackson, Esq.; Stites & Harbison PLLC

(57) ABSTRACT

A staking system for use with a self-watering growing container includes an outrigger structure at each longitudinal end. Each outrigger structure is mountable on the bottom of the growing container to provide stability. Two vertical stakes are attached to respective outrigger structures. Connectors at the top of each stake thus mount a horizontal stake element between the two connectors. A rim clamp secures the vertical stakes, clamping them on the lip of the plant growing container.

8 Claims, 6 Drawing Sheets

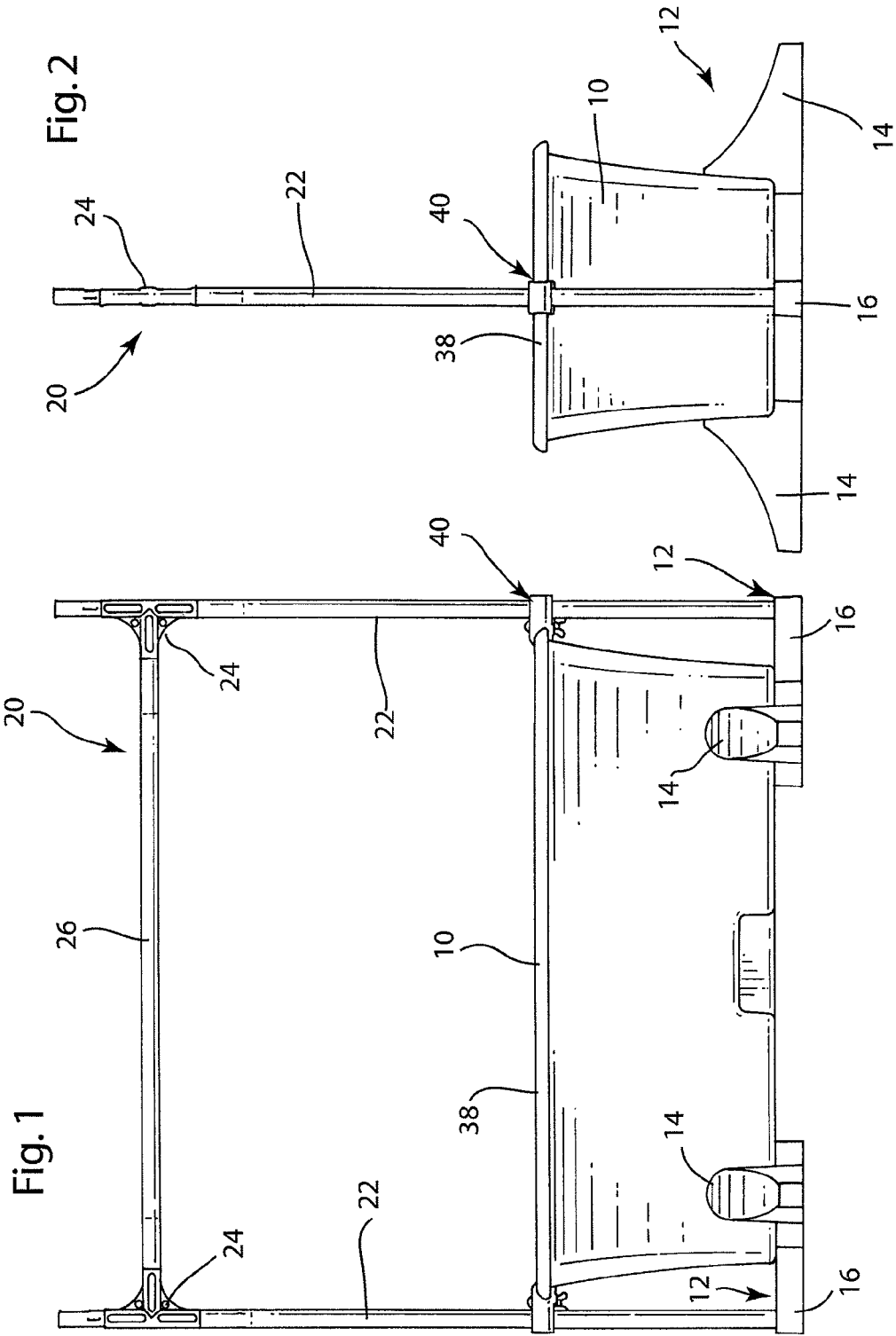

STAKING SYSTEM FOR GROWING CONTAINER

RELATED APPLICATIONS

This application is a continuation of U.S. Application Ser. No. 11/374,307, filed May 1, 2006 now abandoned.

BACKGROUND OF THE INVENTION

The Earthbox® plant growing system is the subject of several U.S. patents which are incorporated herein by reference to provide general description of the elements of the system and how the growing container system is utilized. See U.S. Pat. Nos. 5,103,584; 5,193,306; 5,379,597; 5,524,387; 5,555,675. to Blake Whisenant.

FIELD OF THE INVENTION

The present disclosure relates to a staking system for a self-watering plant growing container marketed under the trademark Earthbox® (U.S. Reg. No. 1,906,561) or the like.

SUMMARY OF THE INVENTION

The present disclosure is directed to a staking system which can be utilized with the basic Earthbox® self-watering growing container. The staking system includes outrigger elements mountable on the bottom of the Earthbox® container, two vertical stakes attached to the outrigger elements, connectors at the top of each stake and a horizontal stake element connected between the two connectors. In addition, the present system includes a rim clamp for securing the vertical stakes and clamping them on the lip of the Earthbox® plant growing container.

BRIEF DESCRIPTION OF THE DRAWINGS

FIG. 1 is a side elevation view of a growing container with the staking system of the present invention attached.

FIG. 2 is an end elevation view of the system depicted in FIG. 1.

DETAILED DESCRIPTION OF THE INVENTION

With reference to FIGS. 1 and 2, the Earthbox® type growing container 10 is depicted as a truncated rectangular structure. As shown in the Whisenant patents noted above, the Earthbox® type growing container defines a container 10 for a growing medium and fertilizer (not shown) for growing plants such as tomato plants, green peppers, etc.

Figure 3:
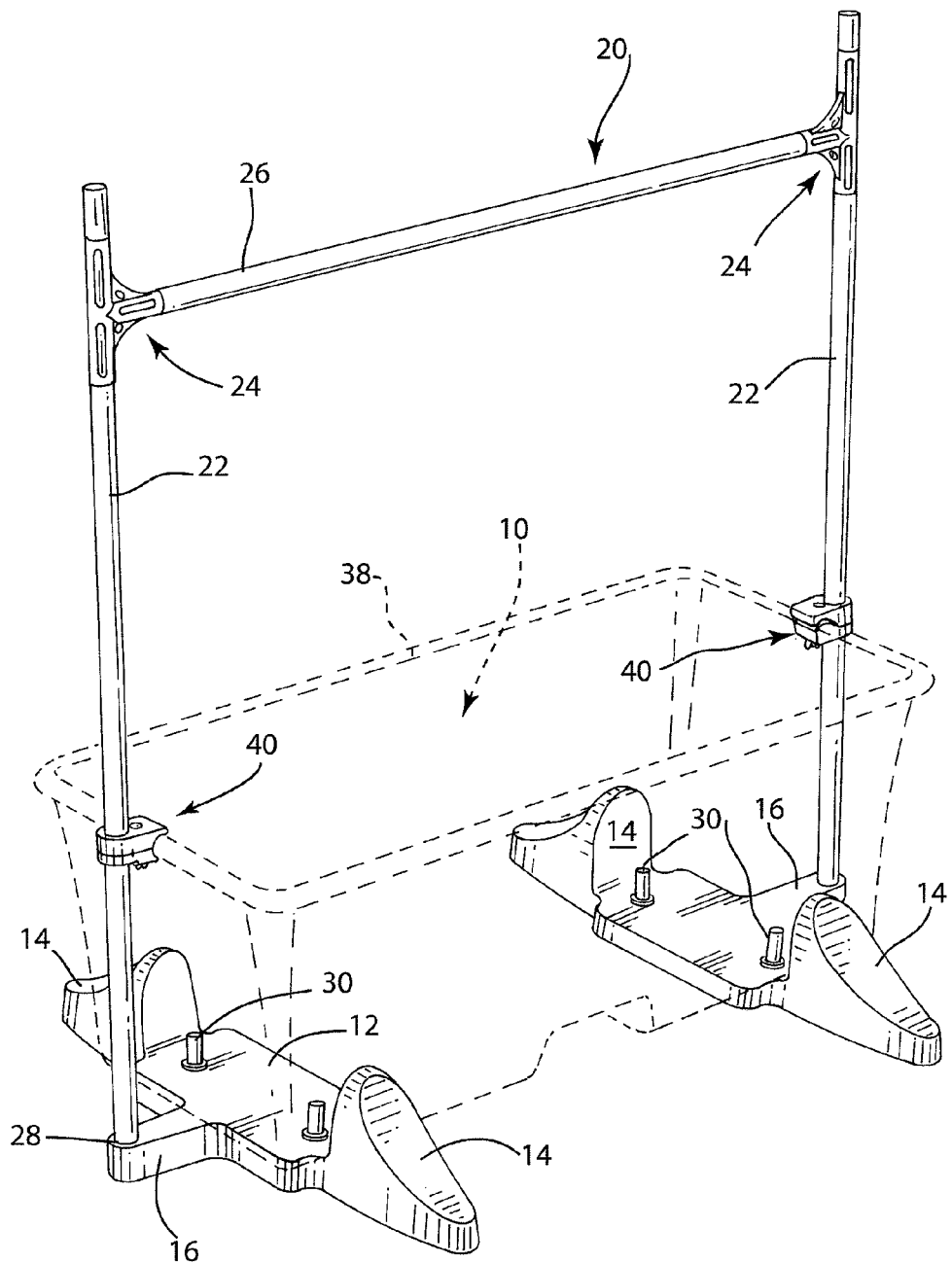
FIG. 3, a rendering with the growing container shown in phantom, is an isometric top, side and end view of the staking system depicted in FIGS. 1 and 2.

At the respective outer lower ends of growing container 10, there is a structure identified as an outrigger 12. As best seen in FIGS. 1 to 5, the outrigger structure 12 is configured to have lateral feet 14 that extend outward from either longitudinal side of the container 10 and a longitudinal foot 16 extending along the longitudinal axis of the container 10. The purpose of the outrigger structure 12 is to provide additional stability to the planted growing container 10 and to provide a support function for a staking system 20 which includes two vertical stakes 22 received in respective holes 28 of longitudinal feet 16, two connectors 24 and a horizontal interconnecting stake element 26 as depicted in FIGS. 1 and 3.

Figure 4:
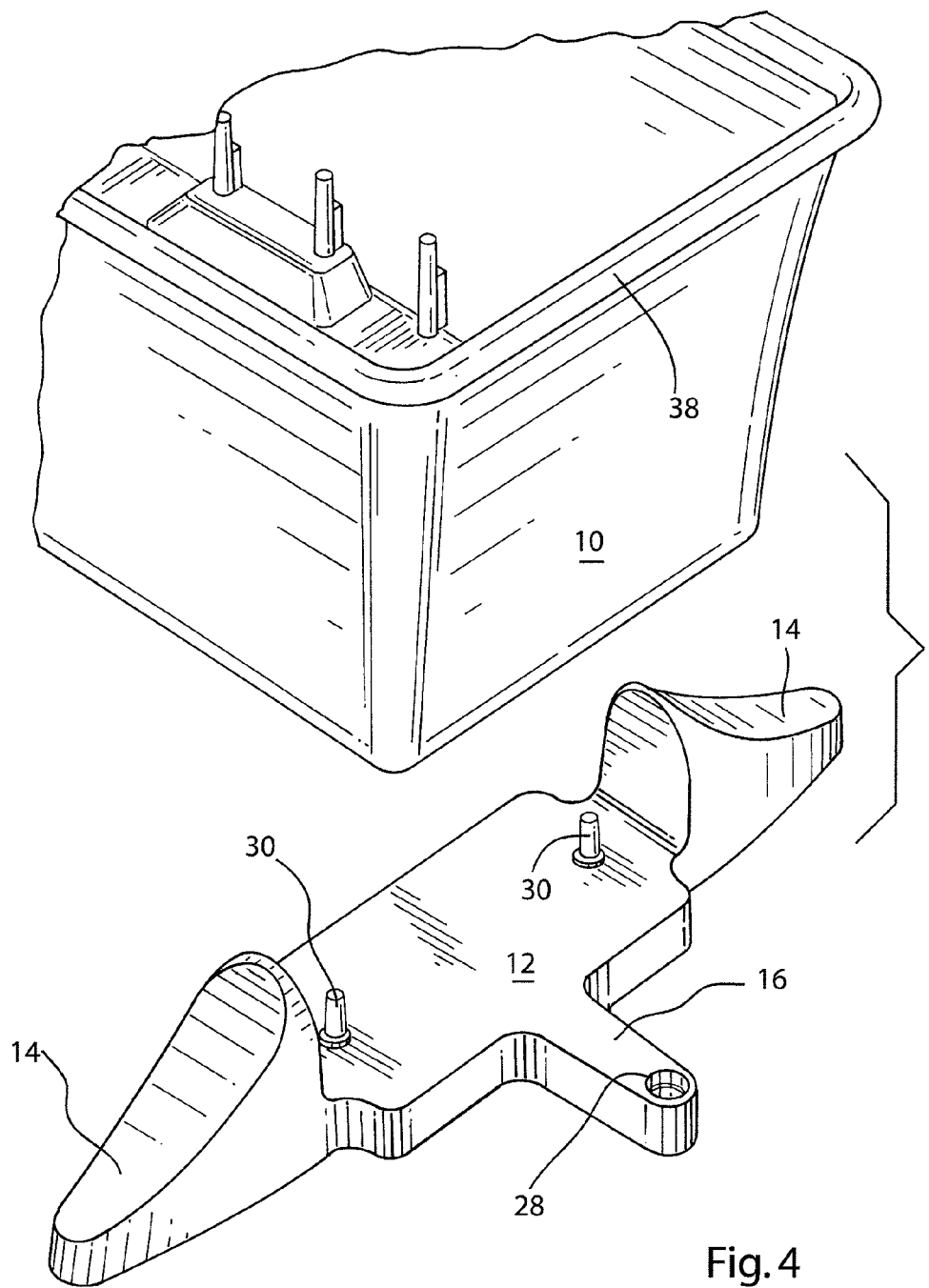
FIG. 4 is a partial top, end and side exploded view showing the construction of the outrigger element which facilitates engagement with the bottom of the container.
Figure 5:
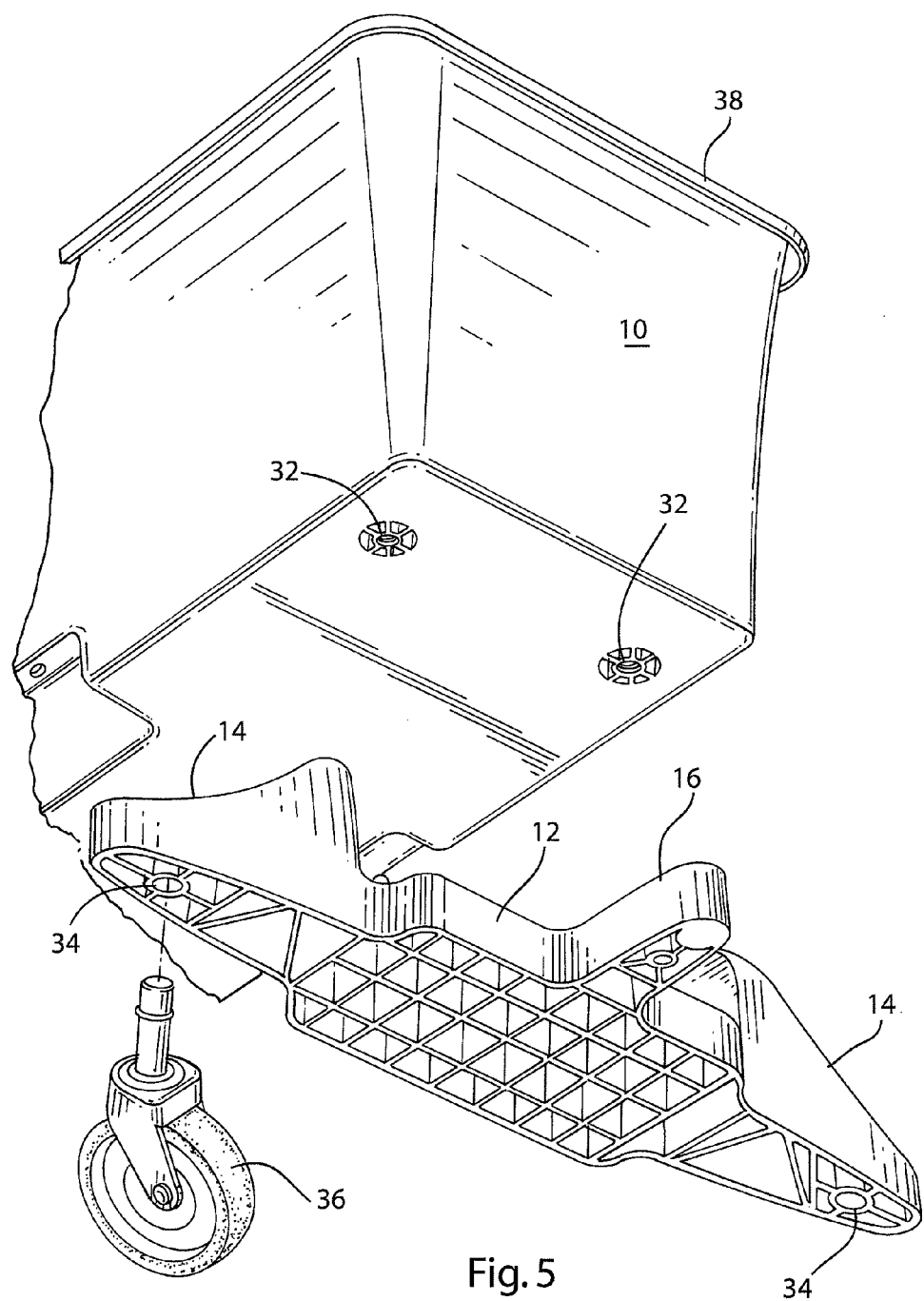
FIG. 5 is a partial bottom, end and side exploded view from the bottom of a container showing the construction of the outrigger element and its interaction with the bottom of the container.

Furthermore, as seen in FIG. 4, the outrigger structure 12 is provided with vertically oriented pins 30 that engage with the bottom of the growing container 10 as further depicted in the exploded view of FIG. 5 wherein spaced holes 32 are shown in the horizontal base of the growing container 10. Also, as depicted most clearly in FIG. 5, the lateral feet 14 of the outrigger structure 12 have bushings or defined holes 34 into which the vertical pin of casters 36 or other wheels (not shown) may be inserted to provide mobility for moving a planted growing container 10. Such ease of mobility is an advantage in that the entire growing container 10 can be moved from one place to another as desired—such as might be desired due to weather changes, the position of the sun during the afternoon, etc. Furthermore, the use of casters 36 makes it much easier to move the growing container when completely planted because the growing container when planted contains water and growing medium of substantial weight.

Figure 6:
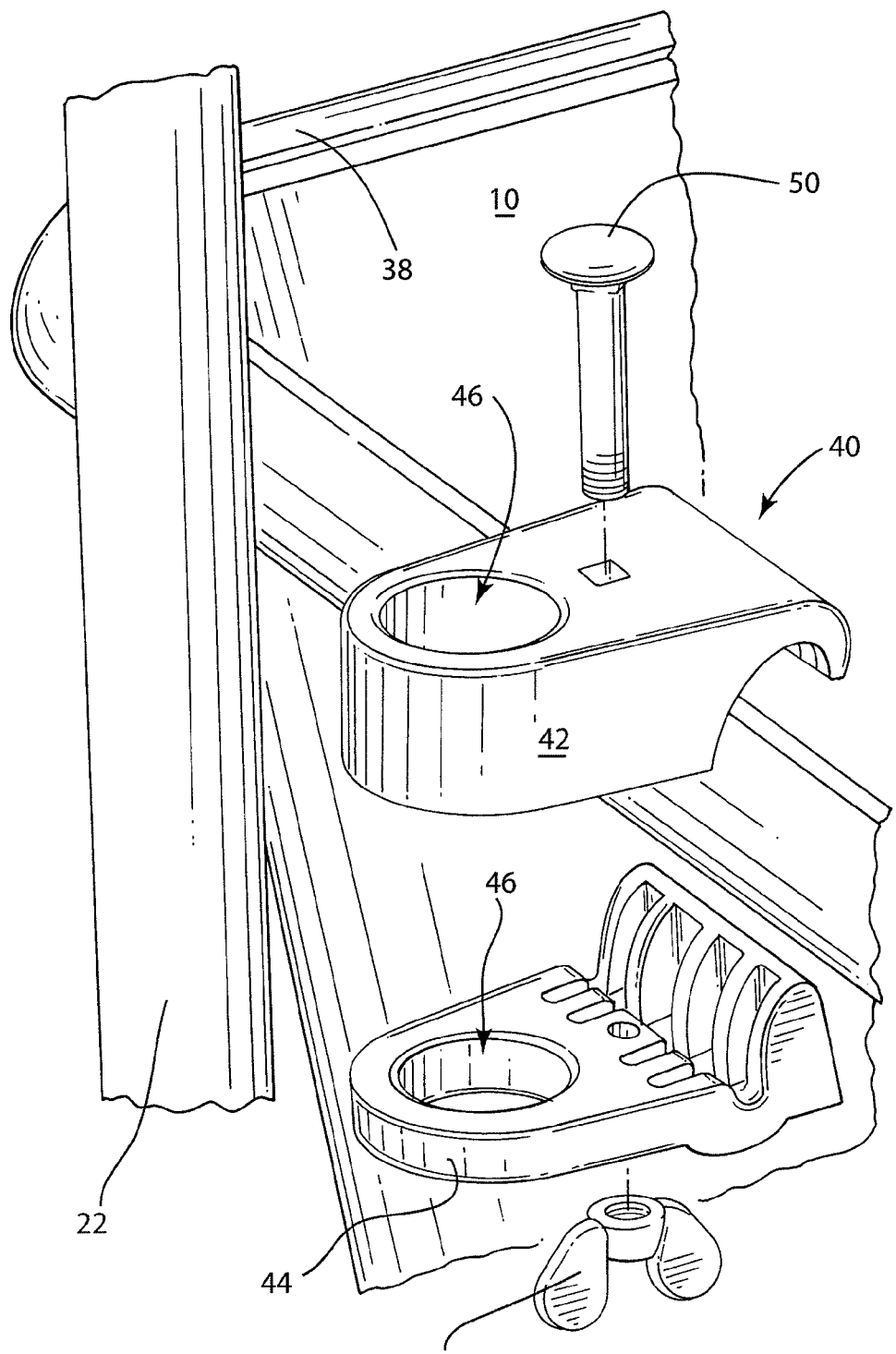
FIG. 6 is a exploded and enlarged view of the rim clamp depicted in FIGS. 1-3.

As depicted in FIGS. 1 and 2, the vertical stakes 22 are reinforced at the level of the rim 38 of the growing container 10 through the use of a rim clamp 40. As depicted in exploded view in FIG. 6, the rim clamp 40 includes an upper clamp element 42 and a bottom clamp element 44, and both elements define an aligned hole 46 through which the vertical stake 22 can be inserted during assembly of the staking system 20. As depicted in FIGS. 1 and 2, when completely assembled, the upper clamp element 42 and the bottom clamp element 44 are engaged and held tightly together by means of a carriage bolt 50 and a wing nut 52 as identified in FIGS. 1 and 6.

Figure 7:
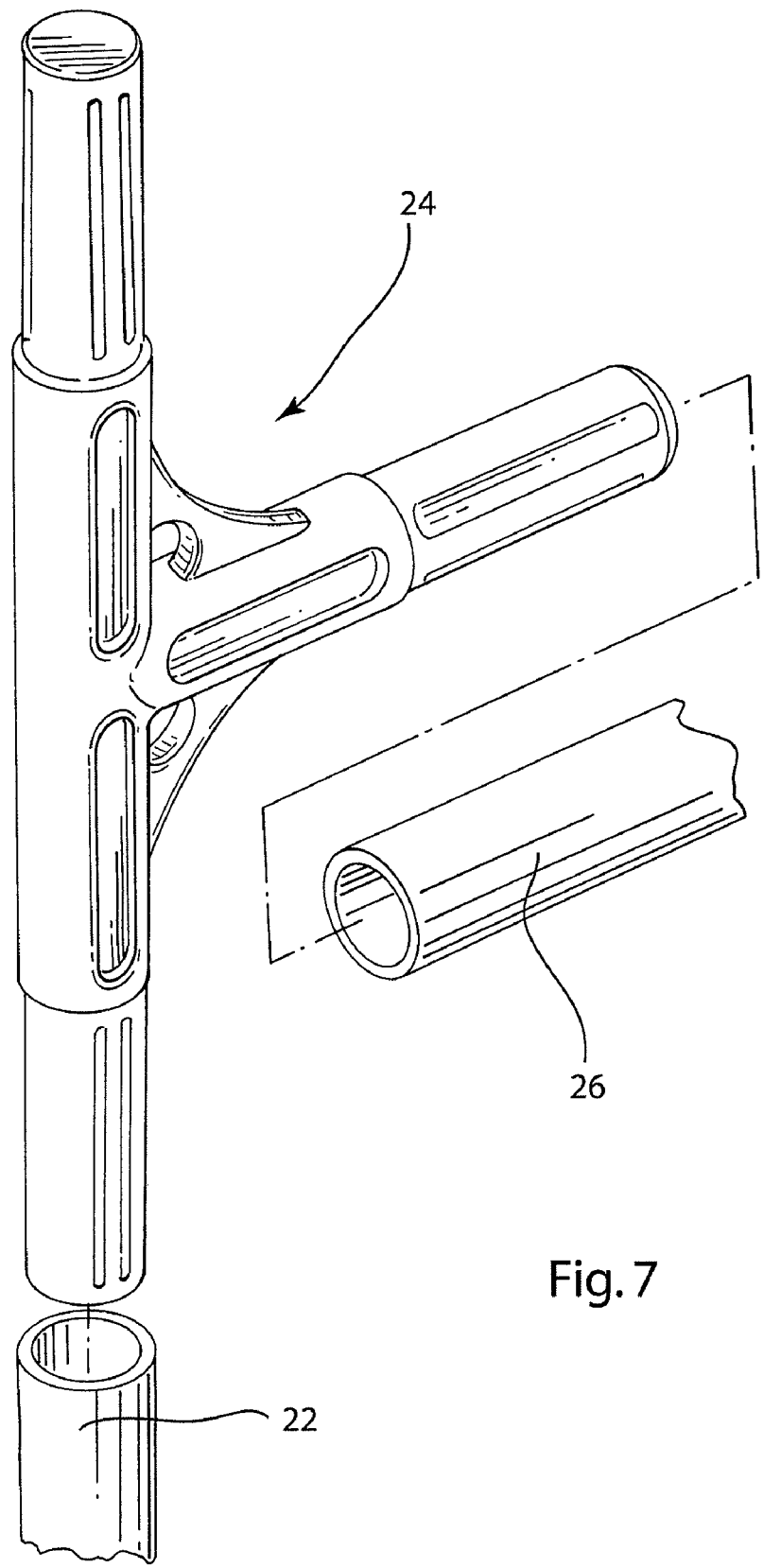
FIG. 7 is a exploded and enlarged view of the connection between the vertical stake and the horizontal stake element depicted in FIG. 1.

FIG. 7 depicts the configuration of the connector 24 useable at the top of the two vertical stakes 22 for connecting the two vertical stakes 24 by means of a horizontal tube element 26. In addition, the top of the depicted connector 24 has provision for insertion into additional vertical stake-like structures or other superstructures (not shown) such as elements to provide partial or full shade or additional vertical stakes for high growing plants that might grow up and beyond the level of the horizontal tube-element 26.

As should be apparent from the various drawings, many of the elements of the staking system 20 are manufactured by means of molded material typically molded plastic which enables a low cost but high durability structure to be manufactured and provided to the gardener consumer.

Further advantages of the disclosed staking system 20 include its simplicity, lightness in weight and inexpensive construction materials. For example, the stakes may be manufactured from commercially available PVC pipe while the connectors and the outrigger structures can be fabricated from injection molded plastics to provide an overall lightweight structure which can be disassembled for ease of shipping and reassembly.

The invention claimed is:

1. An apparatus for growing of plants comprising:
   an elongated container in which plants are grown, said container, having a longitudinal axis and including an elongated horizontal bottom and a surrounding substantially vertical wall member attached to said bottom; said surrounding wall member being defined by a container inverted u-shaped upper rim and;

a pair of outrigger members mounted under said bottom, adjacent opposite respective longitudinal ends thereof, each of said outrigger members including a) a central elongated section connected against and extending across said bottom and perpendicular to said longitudinal axis;

b) means for connecting said section against said bottom, c) lateral elongated feet which extend a substantial distance horizontally from respective outer ends of said central elongated section beyond opposite longitudinal sides of said bottom for engaging with a base surface and stabilizing said apparatus from sideways tipping, each of said lateral elongated feet including an upstanding wall which engages against said wall member of said container whereby said container is laterally trapped to stabilize said apparatus;

d) a longitudinally oriented foot which is connected to and extends horizontally from the midpoint of the length of said central elongated section beyond a longitudinal end of said bottom and said longitudinal foot having a means for removably mounting a vertical stake therein;

a staking system interconnected with said foot and said upper rim for supporting the plants grown in said container including e) a single rigid vertical stake mounted by and extending upwardly from each mounting means of said longitudinally oriented foot, and f) a rigid horizontal stake extending above said container and having opposite ends mounted respectively to said rigid vertical stakes;

g) means for removably mounting said opposite ends respectively to said vertical stakes whereby growing plants may be attached to and supported by said system as they grow up to said rigid horizontal stake, and h) clamping in means for securing intermediate portion of each of said single rigid vertical stakes to its respective adjacent portion of said inverted u-shaped upper rim.

2. An apparatus for the growing of plants as claimed in claim 1;

wherein said means for connecting said central elongated section against said bottom includes a pair of pins connected to and upstanding from said central elongated section; and wherein said bottom of said container defines a pair of closed end bores adjacent to each longitudinal end, said pins and bores being constructed and arranged so that said vertical pins are received in said bores to securely mount said outrigger members to said horizontal bottom.

3. An apparatus for growing plants as claimed in claim 2, wherein said container and said outrigger members are made of injection molded plastic.

4. An apparatus for growing plants as claimed in claim 3 wherein said outrigger members have an inverted U-shaped cross section taken parallel to said longitudinal axis.

5. An apparatus for growing of plants as claimed in claim 1, wherein each of said opposed lateral elongated feet includes a means for mounting a caster wheel, and a caster wheel connected to said mounting means for engagement with said base surface.

6. An apparatus for growing of plants as claimed in claim 1:

wherein said vertical stakes and said horizontal stake have hollow female ends;

wherein said staking system includes a pair of connectors having male ends for connecting each respective said vertical stake to a respective end of said horizontal stake; and wherein said connector includes a further male end to which the hollow female end of a further vertical stake may be attached, whereby said further vertical stake can support growing plants above the horizontal stake.

7. An apparatus for growing plants as claimed in claim 6, wherein each of said further male ends is connected to a hollow female end of said further vertical stake.

8. An apparatus for growing plants as claimed in claim 1, wherein said vertical and horizontal stakes are tubular.

\* \* \* \* \*